(12) United States Patent
Bird

(10) Patent No.: US 8,317,208 B2
(45) Date of Patent: Nov. 27, 2012

(54) VEHICLE SUSPENSION SYSTEM

(76) Inventor: Alan Bryn Bird, Tamworth (GB)

( * ) Notice: Subject to any disclaimer, the term of this patent is extended or adjusted under 35 U.S.C. 154(b) by 254 days.

(21) Appl. No.: 12/993,969

(22) PCT Filed: May 20, 2009

(86) PCT No.: PCT/GB2009/001253
§ 371 (c)(1),
(2), (4) Date: Nov. 22, 2010

(87) PCT Pub. No.: WO2009/141603
PCT Pub. Date: Nov. 26, 2009

(65) Prior Publication Data
US 2011/0084461 A1    Apr. 14, 2011

(30) Foreign Application Priority Data
May 21, 2008 (GB) .................................. 0809171.2

(51) Int. Cl.
*B60G 21/055*    (2006.01)
(52) U.S. Cl. ... 280/124.107; 280/124.106; 280/124.128; 280/124.166; 280/124.167
(58) Field of Classification Search .............. 280/5.507, 280/124.106, 124.107, 124.128, 124.13, 280/124.134, 124.137, 124.149, 124.152, 280/124.153, 124.166, 124.167, 124.17, 280/124.171, 124.172, 124.173
See application file for complete search history.

(56) References Cited

U.S. PATENT DOCUMENTS

| | | | |
|---|---|---|---|
| 2,067,640 A * | 1/1937 | Madden .................. | 267/186 |
| 2,099,819 A | 11/1937 | Mercier | |
| 2,166,368 A * | 7/1939 | Perron .................. | 280/124.128 |
| 2,202,689 A * | 5/1940 | Samuel .................. | 267/275 |
| 2,318,245 A * | 5/1943 | McFarland .................. | 180/409 |
| 3,298,709 A * | 1/1967 | Mercier .................. | 280/104 |
| 3,402,783 A * | 9/1968 | Trachte et al. .................. | 180/360 |
| 3,736,002 A * | 5/1973 | Grosseau .................. | 280/124.13 |
| 4,014,561 A * | 3/1977 | Tomiya et al. .................. | 280/104 |
| 4,168,075 A * | 9/1979 | Matschinsky .................. | 280/5.52 |

(Continued)

FOREIGN PATENT DOCUMENTS

| | | |
|---|---|---|
| FR | 2453037 | 10/1980 |
| FR | 2636570 | 3/1990 |
| FR | 2649047 | 1/1991 |

(Continued)

OTHER PUBLICATIONS

International search report dated Sep. 11, 2009 in corresponding PCT/GB2009/001253.

*Primary Examiner* — Paul N Dickson
*Assistant Examiner* — Barry Gooden, Jr.
(74) *Attorney, Agent, or Firm* — Young & Thompson

(57) ABSTRACT

Vehicle suspension having arms (6) and (7) for each wheel (14) and (15) respectively, each arm (6) having more than one sprung strut (18) and (19) of which two such struts each operates exclusively between two different arms. Each arm's rotational axis (28) and (38) respectively intersects a vertical longitudinal plane through the center of road contact with the wheel at a point (45) and (46) respectively on a straight lines (47) and (48) respectively between the center of contact with the road and a point at or near the anticipated center of gravity (49) of the suspended mass projected onto the plane. Preferably, the vehicle transmission avoids applying a moment about the arm's rotation axis, braking is attached to the arm and steering linkage is passed through or near the arm's axis of rotation.

18 Claims, 2 Drawing Sheets

U.S. PATENT DOCUMENTS

Figure 1:
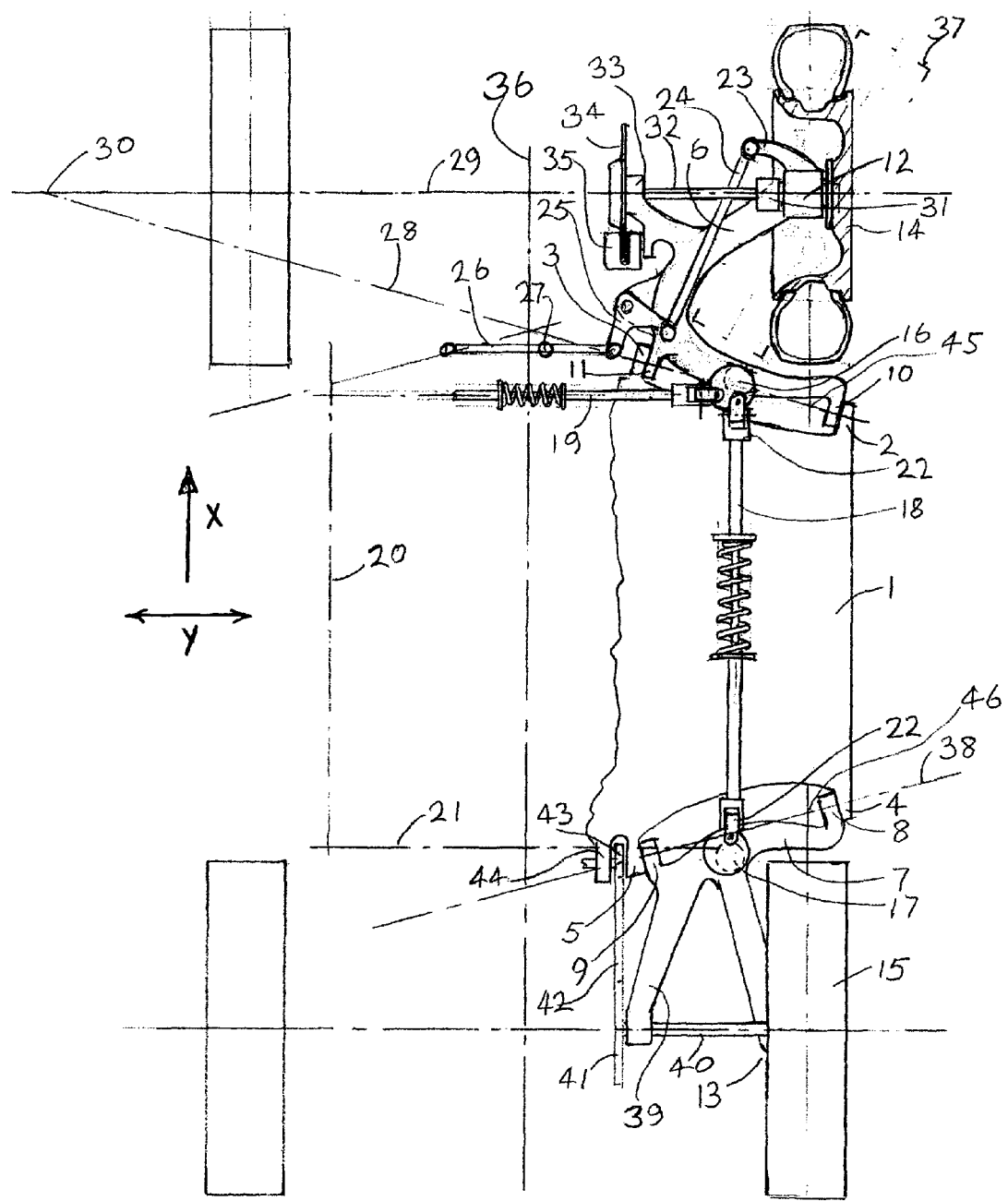

| | | | |
|---|---|---|---|
| 4,749,206 A | | 6/1988 | Delery et al. |
| 5,480,188 A | * | 1/1996 | Heyring ................ 280/124.104 |
| 5,562,305 A | * | 10/1996 | Heyring .................... 280/5.507 |
| 5,839,741 A | | 11/1998 | Heyring |
| 6,367,831 B1 | * | 4/2002 | Lim et al. ............... 280/124.102 |
| 6,499,754 B1 | * | 12/2002 | Heyring et al. ........ 280/124.106 |
| 7,625,001 B2 | * | 12/2009 | Pavuk .................... 280/124.166 |
| 2005/0001389 A1 | * | 1/2005 | Lin ............................ 280/5.507 |
| 2007/0262550 A1 | * | 11/2007 | Pavuk ................... 280/124.107 |
| 2007/0278752 A1 | * | 12/2007 | Schedgick ................ 280/5.507 |
| 2011/0109052 A1 | * | 5/2011 | Hatzikakidis .................. 280/5.5 |

FOREIGN PATENT DOCUMENTS

| | | |
|---|---|---|
| FR | 2700501 | 7/1994 |
| GB | 191300965 | 4/1914 |
| GB | 214080 | 4/1924 |
| GB | 811235 | 4/1959 |
| GB | 1179282 | 1/1970 |
| GB | 1363822 | 8/1974 |
| GB | 1499298 | 1/1978 |
| GB | 1512377 | 6/1978 |
| GB | 2359527 | 8/2001 |
| WO | 2006016195 | 2/2006 |

* cited by examiner

VEHICLE SUSPENSION SYSTEM

This invention relates to a vehicle suspension system which enables the body of a vehicle to be supported resiliently by three or more wheels.

The invention relates in particular, though not exclusively, to a vehicle suspension system for a road (or off-road) vehicle and for which the properties of the suspension system may significantly affect the pitch and roll movements experienced by the vehicle body.

It is well known to use leading arm suspensions for front wheels and trailing arm suspensions for rear wheels. Previously however, the springs have been located between suspension arms at one end of the spring and the suspended mass of the vehicle or members attached to the suspended mass of the vehicle at the other or by torsion devices attached to the suspended mass of the vehicle or by elastic links between suspension arms in pairs.

In these known systems the rise and fall of any wheel or pair of wheels has a proportional influence on the rise and fall of the suspended vehicle mass and simultaneously proportionally affects the pitch and/or the roll of that vehicle mass. This pitch and roll movement makes the ride of vehicles uncomfortable, particularly in short wheel base vehicles and high center of gravity vehicles.

It is also known to provide leading and trailing arm suspensions in which the suspension arms are elastically connected to each other in front and rear pairs either directly or by linkages and levers, with the rotational axes of the suspension arms being at right angles to the main longitudinal and/or transverse axes of the vehicle.

Previous examples of leading and trailing arm suspensions provide for no specific relationship with the center of gravity of the suspended mass of the vehicle nor do they address the influence of power delivery, cornering, braking or steering upon the suspension. Relevant examples are as follows:—

GB1913/00965 1914 HODGSON Uses leading and trailing arms in elastically linked pairs but that link also has a connection to the main mass of the vehicle. There is no specific relationship of the suspension arms to the center of gravity of the vehicle. The influences of power delivery, cornering and braking upon the suspension are not addressed.

GB214080 1924 BAINES Uses indirect links between suspension arms but with no elastication in the links and there is no specific relationship of the suspension arms to the center of gravity of the vehicle. The influences of power delivery, cornering and braking upon the suspension are not addressed.

U.S. Pat. No. 2,099,819 1937 MERCIER Uses suspension arms elastically linked across the chassis but either uses them in collaboration with torsion devices or takes the link via a controlling device on the chassis, and there is no specific relationship of the suspension arms to the center of gravity of the vehicle. The influences of power delivery, cornering and braking upon the suspension are not addressed, GB811235 1959 DAIMLER BENZ Uses suspension arms linked elastically but the link is indirect being via a hydraulic device attached to the chassis and the objectives are load re-levelling. There is no specific relationship of the suspension arms to the center of gravity of the vehicle. The influences of power delivery, cornering and braking upon the suspension are not addressed GB1363822 1974 MOOG Uses suspension arms in connection with tandem axles which are configured so that rise and fall movement of the wheels results in horizontal movement of the axles which are elastically connected in pairs to resist that movement. Does not apply to independent stub axles and there is no specific relationship of the suspension arms to the center of gravity of the vehicle. The influences of power delivery, cornering and braking upon the suspension are not addressed.

FR2453037 1980 LEMAIRE Uses suspension arms but elastically connected indirectly to the chassis and there is no specific relationship of the suspension arms to the center of gravity of the vehicle. The influences of power delivery, cornering and braking upon the suspension are not addressed.

FR2636570 1990 STAHL As MOOG above but applies to wheels in pairs in which one wheel is aligned with another. As with MOOG is unstable unless used with two pairs all in alignment or as part of a larger vehicle with other axles. There is no specific relationship of the suspension arms to the center of gravity of the vehicle. The influences of power delivery, cornering and braking upon the suspension are not addressed.

FR2700501 1994 RENAULT Uses leading and trailing arms but each arm is controlled by a variable length connection to the chassis. There is no specific relationship of the suspension arms to the center of gravity of the vehicle. The influences of power delivery, cornering and braking upon the suspension are not addressed.

U.S. Pat. No. 5,839,741 1998 HEYRING Uses suspension arms elastically linked two ways across a chassis but using torsion bars which connect with the chassis. There is no specific relationship of the suspension arms to the center of gravity of the vehicle. The influences of power delivery, cornering and braking upon the suspension are not addressed.

WO2006016195 2006 DIMITRIOS Uses suspension arms elastically linked across a chassis but in pairs. There is no specific relationship of the suspension arms to the center of gravity of the vehicle. The influences of power delivery, cornering and braking upon the suspension are not addressed.

GB1179282 HALL AND LYNES. Uses torsion springs for transferring forces between the main mass of the vehicle and the road. There is no specific relationship of the suspension arms to the center of gravity of the vehicle. The influences of power delivery, cornering and braking upon the suspension are not addressed.

CITROEN 2CV. Uses leading and trailing arms but linked in two pairs. There is no specific relationship of the suspension arms to the center of gravity of the vehicle. The brakes are mounted inboard on the chassis and the drive input has no specific relationship with the rotational axes of the suspension arms the result of which is that the suspension performance in accelerating, cornering and braking is adverse in this respect.

One object of the present invention is to provide an improved vehicle suspension system which, for a given rise and fall stiffness of the suspended mass of the vehicle, reduces the pitch and roll stiffness and also the pitch and roll induced by cornering, acceleration and braking thereby benefiting the ride quality.

Another object of this invention is to provide an improved vehicle suspension system in which for any given rise and fall stiffness of the vehicle as a whole the action of the springs of any individual wheel or pair of wheels causes a reduced pitch and roll angular acceleration relative to a conventional suspension thereby improving ride comfort.

The present invention seeks also to reduce, preferably to negligible proportions the phenomenon known as bounce steer.

According to one aspect of the present invention there is provided a vehicle suspension system for a vehicle comprising at least three wheels each mounted at the outer end of a respective suspension arm which is rotationally connected at an inner end to the suspended mass of the vehicle, each said arm of the vehicle suspension system having attached thereto an end of each of at least two suspension arm connectors, the other ends of said suspension arm connectors each being attached to a respective one of two other suspension arms of the suspension system, and wherein the axis of rotation of each suspension arm is oriented such that each of the suspension arm connectors attached to that arm has a turning moment about said axis.

By connecting each suspension arm connector to a suspension arm at a position which is spaced from the axis of rotation of that suspension arm movement of the suspension arm will generally result in the connector being subject to a compressive or tensile loading which it then transmits to another of the suspension arms to tend to cause that other suspension arm to move about it's axis of rotation.

In use of the vehicle suspension system with a wheeled vehicle, each of the suspension arms for the at least three wheels may have an axis of rotation which intersects a vertical plane which is parallel with the normal, longitudinal direction of travel of the vehicle and contains the center of contact between the associated wheel and a ground surface at a point on a line containing the center of contact of that wheel with the ground surface and a selected point in the said plane close to or at the anticipated center of gravity of the vehicle's suspended mass as projected at right angles onto the said plane.

At least one of the suspension arm connectors may comprise a compression resisting strut. Also at least one of the suspension arm connectors may comprise a tension resisting tie.

The suspension arm connector may comprise a resilient member which may, for example, be elastically deformable and/or comprise a mechanical spring and/or comprise a fluid type spring. Thus the connector may be in the form of a sprung link.

In the case of a vehicle suspension system for a four wheeled vehicle each of four suspension arms has attached thereto one suspension arm connector which extends front and back relative to the normal direction of travel of the vehicle and which is attached to another suspension arm at the same side of the vehicle and a second suspension arm connector which extends across the direction of travel and which is attached to another suspension arm at the other side of the vehicle.

For a vehicle having three or more wheels the vehicle suspension system may comprise at least one suspension arm which has attached thereto one suspension arm connector which extends either in a longitudinal front and back direction relative to the normal direction of travel of the vehicle or transversely across said longitudinal direction of travel and a second suspension arm connector which extends in a direction inclined relative to each of said longitudinal and transverse directions for attachment to another suspension arm which lies displaced from said at least one suspension arm in both the longitudinal and transverse directions.

As viewed in plan said front and back direction and said direction across the direction of travel may be substantially perpendicular relative to one another and may, respectively, be substantially parallel and perpendicular relative to said normal direction of travel.

The intention of the present invention is that each suspension arm connector shall act solely or substantially solely to transmit forces between the suspension arms of a vehicle and shall not transmit any forces directly to the suspended mass, e.g. the chassis or vehicle body. However it is not intended to exclude from the scope of the invention a system in which one or more of the suspension arm connectors has, for example, a flexible connection (such as for a fluid supply to a pneumatic spring), or vibration damper or other such non-structural connection.

In the case of connectors in the form of sprung links the objects of the invention may be achieved by having two sprung links for each wheel, each sprung link shared exclusively with another wheel thereby having no connection with the suspended mass of the vehicle other than via the suspension arms to which they are attached. Thus when one wheel rises or falls alone the effective length of each spring is doubled and the spring rate halved thereby reducing the instantaneous angular acceleration. Further, the arms opposing the sprung links receive greater spring force thereby inducing opposing angular movement and further reducing both instantaneous angular accelerations and magnitude of angular movement in both pitch and roll. The links may be struts or ties depending on where they are placed.

Accordingly the present invention provides that pitch induced by braking or acceleration may be eliminated or reduced by placing the axis of rotation of each suspension arm as near as may be desired to the line of braking or accelerating resultant reaction from the road. Whilst the same could be done simultaneously for the cornering resultant reaction such a geometry would create other undesirable problems and the designer is left to choose the optimum, this invention providing a proportional move towards the cornering resultant reaction line position. Pitch induced by power transmission may be eliminated in this arrangement by transmitting the drive forces via the said axis. Bump steer may be eliminated by passing the steering action through the said axis.

Selection of the resiliency properties of the respective suspension arm connectors also allows the pitch and roll performance to be varied independently and it will be appreciated that the suspension arm connectors may have any degree of elasticity including substantially zero resilience thereby being substantially inelastic links.

For a vehicle having three or more wheels there may be provided, in accordance with the present invention, a vehicle suspension system, and a vehicle, in which each wheel is mounted at the outer end of a suspension arm and the arm is rotationally connected at its inner end to the vehicle's suspended mass each said arm having two or more sprung struts or ties attached one such sprung strut or tie being exclusively attached at its sole opposing connection to another of the suspension arms and another of the said sprung struts or ties being exclusively attached at its sole opposing connection to a different one of the said suspension arms this arrangement characterised by the axis of rotation of each suspension arm being positioned so that both said sprung struts or ties have a lever arm about the said axis and the said axis intersecting a vertical longitudinal plane containing the center of contact of the wheel with the road at a point on a straight line containing the center of contact of that wheel with the road and a selected point in the said plane close to or at the anticipated center of gravity of the vehicle's suspended mass projected at right angles onto the said plane such point preferably being common to all wheels in the same plane and preferably any brakes on the said wheels being mounted so that they react against the said arms and any mechanical power or steering action transmitted to or from the wheel being transmitted via, or as close as is practical to, the said axis of rotation.

The suspension arms may be made of fabricated, cast or pressed metal, moulded composites or plastics or any other reasonably rigid material. In the case of resilient suspension arm connectors having springs, said springs may be coiled metal or elastomeric tension springs for instance if placed below the axes of rotation. If placed above the axes of rotation they may be any kind of compression spring including coiled metal, elastomeric, air springs, gas springs, etc. The springs may also take the form of pistons acting in cylinders where the fluid displaced provides the resilience and may be connected to a central accumulator. The springs may also be adjustable so that the vehicle may be re-levelled to compensate for the addition of load. The pivots on the axes of rotation may be plain bearings, roller or ball bearings or elastomeric bearings augmenting the spring function whether by torsion or lateral displacement. They may also be simple hinges or hinges formed from flexible elastomers.

It will be appreciated that there could be any practical number of wheels greater than two. It will also be appreciated that each suspension arm connector such as a sprung strut or tie will be sized and pre-loaded according to its wheel load, the length of the arm, the distance from the spring axis to the arm rotation axis and the contribution of the other suspension arm connectors acting upon its arm. The performance of the suspension arm connector will be optimised when its attachments are spaced from the rotation axes of the arms proportionately to their wheel loads. It will be further appreciated that the described action of each sprung strut or tie may be graded down to zero thereby becoming the same as conventional systems when the opposing fixing is at or near the rotation axis of the opposing arm. It will be further appreciated that sprung struts or ties may be springs on their own or springs extended by or contained between relatively inelastic elements on the same axis or telescopic devices having springs or sprung fluids contained within telescopic devices. It will be further appreciated that sprung struts or ties may have varying degrees of springiness from full length springs between arms to solid rods or tubes having no more than their own linear elasticity. It will be further appreciated that a convenient embodiment will be achieved wherein sprung struts or ties are each shared exclusively between two suspension arms as is depicted below.

Figure 2:
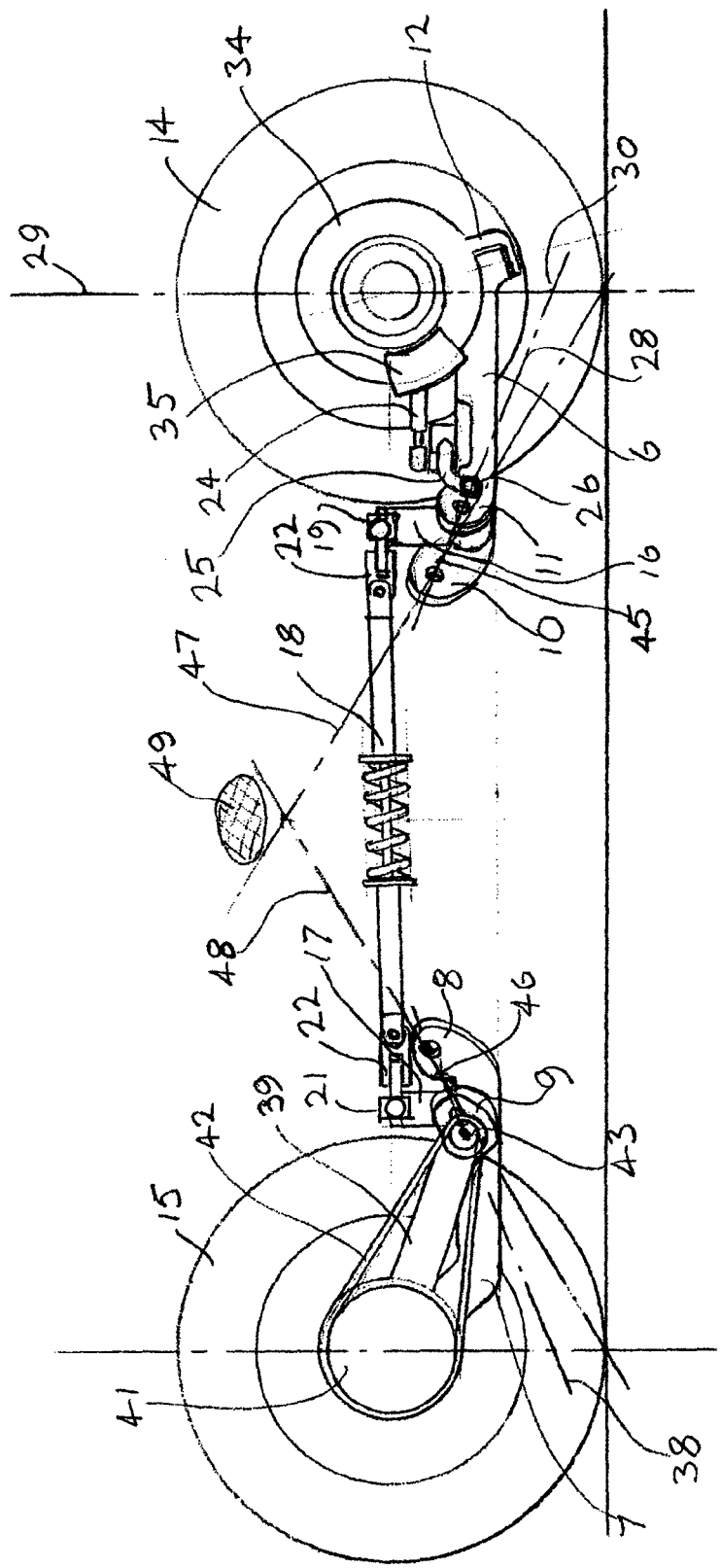

Preferred embodiments of the invention will now be described, by way of example only, with reference to the accompanying drawings in which FIG. 1 is a diagrammatic plan of part of the suspension for a four wheeled vehicle having a suspension system in accordance with the present invention, with most of the main body of the vehicle cut away and the remaining part shown in skeleton outline for clarity, and FIG. 2 is a diagrammatic view from the middle of a vehicle towards the left side wheels of the view of FIG. 1 and showing the suspension again with the main suspended mass of the vehicle omitted for clarity As shown in FIG. 1 the main suspended mass 1 of the vehicle has means 2,3,4 and 5 for holding rotational bearings into which leading suspension arm 6 and trailing suspension arm 7 are engaged by means of counterpart bearings in lugs 8 and 9 for the rear arm 7 and lugs 10 and 11 for the front arm 6. Thus in FIG. 1 the longitudinal, forwards direction of normal travel of the vehicle is indicated by the arrow X, and arrow Y is the transverse direction.

At the outer end of leading arm 6 wheel hub 12 is pivotally mounted and at the outer end of trailing arm 7 rear hub 13 (not shown) is rigidly mounted. These hubs carry front wheel assembly 14 and rear wheel assembly 15 respectively.

The leading and trailing arms 6 and 7 have upward extensions 16 and 17 respectively between which extensions is mounted sprung strut 18 by means of universal joints (or ball joints) 22. Other sprung struts 19, 20 and 21 are similarly mounted between the upward extensions of the other leading and trailing arms not shown.

Front hub 12 has steering arm 23 to which is pivotally attached steering rod 24 which at its other end is pivotally engaged with rocker arm 25 pivotally mounted on the arm 6 and operated by transverse steering link 26 having means 27 for applying steering action. The pivot connection of rocker 25 to link 26 is arranged to be on axis 28 or as near as is practicable.

Leading arm 6 rotates about axis 28 which is inclined to the longitudinal direction X, transverse direction Y and a vertical direction perpendicular to X and Y. The axis 28 is established by the positioning of chassis members 2 and 3 such that axis 28 intersects at point 30 with a vertical transverse plane 29 passing through the center of the front wheel 14 and intersects at point 45 with a longitudinal vertical plane through the center of the contact of wheel 14 with the road. Trailing arm 7 rotates about axis 38 established by the positioning of chassis members 4 and 5 such that axis 38 intersects at point 46 with a longitudinal vertical plane through the center of contact with the ground of wheel 15. Leading arm 6 is shaped to accommodate wheel 14 when steered in a right hand turn as indicated by marks 37.

Universal or constant velocity joint 31 connects half shaft 32 to disc 34 mounted on extension 33 to arm 6 and the rotation of disc 34 may be resisted by caliper assembly 35. Drive for the rear wheels is provided by arm 39, an extension of trailing arm 7, which carries half-shaft 40 connecting wheel 15 with chain-wheel 41 driven by chain 42 running on drive-sprocket 43. The bearing for sprocket 43 is mounted on a part 44 of the vehicle chassis 1 such that the center of sprocket 43 is as close as is practicable to the axis 38. In this particular manifestation of the invention the vehicle is symmetrical about longitudinally extending center-line 36, and may also have front/back symmetry where appropriate. It will be appreciated that for a four-wheel-drive vehicle, disc 34 could be replaced with a chain-wheel in a similar arrangement as for the rear wheels.

As shown in FIG. 2 front wheel 14 is connected via swivel hub 12 to the outer end of leading arm 6. Wheel 14 is braked by disc 34 and caliper assembly 35 and steered by steering rod 24 connected to rocker arm 25 operated by transverse link 26. Leading arm 6 is maintained in equilibrium about axis 28 which passes through lugs 10 and 11 against the upward reaction of the ground by its upward extension 16 acted upon by the combined action of sprung struts 18 and 19.

The leading arm rotational axis 28 intersects at point 45 with line 47 in a longitudinal vertical plane through the center of contact of wheel 14 with the ground and intersects at point 30, a selected distance from the ground, with transverse plane 29.

Rotational axis 38, which intersects at point 46 with a longitudinal plane through the center of contact of wheel 15 with the ground, is also arranged in this manner though not necessarily with precise symmetry. Rear wheel 15 is driven by chain-wheel 41 mounted on extension 39 to trailing arm 7 and connected to powered sprocket 43 by chain 42. Trailing arm 7 has lugs 8 and 9 through which passes its rotational axis 38. Arm 7 is held in equilibrium about this axis 38 against the upward reaction from the ground by upward extension 17 of arm 7 to which is attached via universal joints 22 sprung struts 18 and 21.

Accordingly it will be understood that in this embodiment of the invention each sprung strut is common to two adjacent suspension arms, thus providing an arrangement which may be termed a double linked suspension, and lines 47 and 48 are arranged to intersect a short distance from or within the zone 49 where the center of gravity of the vehicle's suspended mass, projected onto the plane containing lines 47 and 48, is expected to be found.

The invention claimed is:

1. A vehicle suspension system for a vehicle comprising at least three wheels each mounted at an outer end of a respective suspension arm which is rotationally connected at an inner end to a suspended mass of the vehicle, each said arm of the vehicle suspension system having attached thereto an end of each of at least two suspension arm connectors, other ends of said suspension arm connectors each being attached to a respective one of two other suspension arms of the suspension system, an axis of rotation of each suspension arm being oriented such that each of the suspension arm connectors attached to that arm has a turning moment about said axis, and each said suspension arm connector contributing a force to the turning moment required to suspend the suspended mass of the vehicle at one suspension arm and acting in tension or compression to deliver a reaction to the force to a suspension arm at the other end of the suspension arm connector.

2. A vehicle suspension system according to claim 1 wherein in use, the axis of rotation of each of the suspension arms for the at least three wheels intersects vertical plane which is parallel with a longitudinal direction of travel of the vehicle and contains a center of contact between the associated wheel and a ground surface at a point on a line containing the center of contact of that wheel with the ground surface and a selected point in the plane close to or at the anticipated center of gravity of the vehicle's suspended mass as projected at right angles onto the plane.

3. A vehicle suspension system according to claim 1 wherein at least one of the suspension arm connectors is a tension resisting tie.

4. A vehicle suspension system according to claim 1 wherein the vehicle is a four wheeled vehicle, wherein each of four suspension arms has attached thereto one suspension arm connector which extends front to back relative to a normal direction of travel of the vehicle and which is attached to another suspension arm at the same side of the vehicle and a second suspension arm connector which extends across the direction of travel and which is attached to another suspension arm at the other side of the vehicle.

5. A vehicle suspension system according to claim 1 wherein at least one suspension arm has attached thereto one suspension arm connector which extends either in a longitudinal front to back direction relative to a normal, longitudinal direction of travel of the vehicle or transversely across said longitudinal direction and a second suspension arm connector which extends in a direction inclined relative to each of said longitudinal and transverse directions for attachment to another suspension arm which lies displaced from said at least one suspension arm in at least one of the longitudinal and transverse directions.

6. A vehicle suspension system according to claim 1 wherein the suspension arm for each front wheel of the vehicle, as considered in a direction of travel of the vehicle, is a leading arm and the suspension arm for each rear wheel is a trailing arm.

7. A vehicle suspension system according to claim 1 wherein at least one of the suspension arm connectors is a compression resisting strut.

8. A vehicle suspension system according to claim 7 wherein the suspension arm connector comprises a resilient member.

9. A vehicle suspension system according to claim 8 wherein the resilient member is elastically deformable.

10. A vehicle suspension system according to claim 8 wherein the resilient member comprises a mechanical spring.

11. A vehicle suspension system according to claim 8 wherein the suspension arm connector comprises a fluid type spring.

12. A vehicle comprising a vehicle body and at least three wheels wherein the vehicle body is suspended relative to the at least three wheels of the vehicle by a vehicle suspension system according to claim 1.

13. A vehicle comprising a suspension system having at least three suspension arms each supporting a vehicle wheel and having a respective axis for rotation relative to a body of the vehicle, each arm of the vehicle suspension system having attached thereto an end of each of at least two suspension arm connectors, other ends of said at least two arm connectors each being attached to a respective one of two other suspension arms of the suspension system, the axis of rotation of each suspension arm being oriented such that each of the suspension arm connectors attached to that arm has a turning moment about said axis, and wherein the axis of rotation of each suspension arm intersects a vertical, longitudinal plane, being a plane parallel with a longitudinal direction of movement of the vehicle and containing a center of contact of the wheel with a ground surface, at a point on a line containing the center of contact of the wheel with the ground surface and a selected point in the plane close to or at an anticipated center of gravity of the vehicle's suspended mass as projected at right angles onto the plane.

14. A vehicle according to claim 13 comprising at least three suspension arm connectors which are each devoid of any substantial structural, load transmitting attachment to the suspended mass of the vehicle.

15. A vehicle according to claim 13 wherein the vehicle comprises brake means for the vehicle wheels and said brake means is mounted in a manner whereby brake reaction forces act against said suspension arms.

16. A vehicle according to claim 13 comprising means for transmission of mechanical drive power to or from at least one of the wheels, wherein said power is transmitted via or close to the axis of rotation of the suspension arm associated with the wheel.

17. A vehicle according to claim 13 comprising at least one steered wheel wherein steering input is transmitted via or close to the axis of rotation of the suspension arm.

18. A vehicle according to claim 13 comprising a steering rod which engages with a rocker arm mounted on one of said at least three suspension arms.

* * * * *